United States Patent Office 3,140,489
Patented July 7, 1964

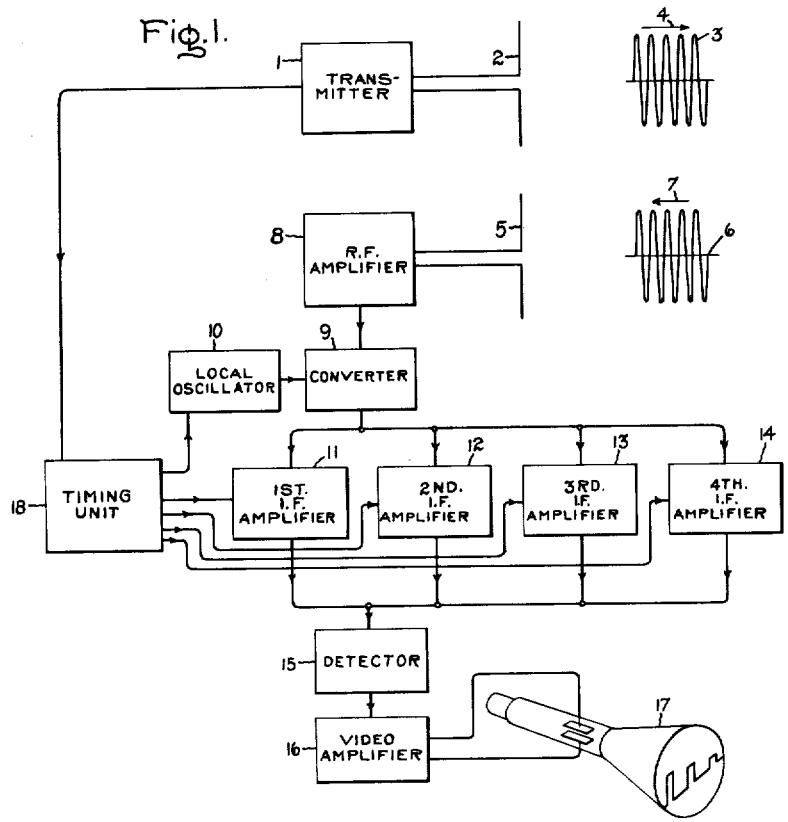
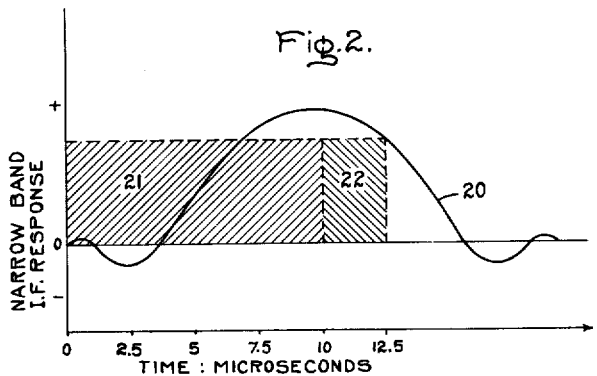
Inventor:
John W. Downie,
by Merton D. Moore
His Attorney.

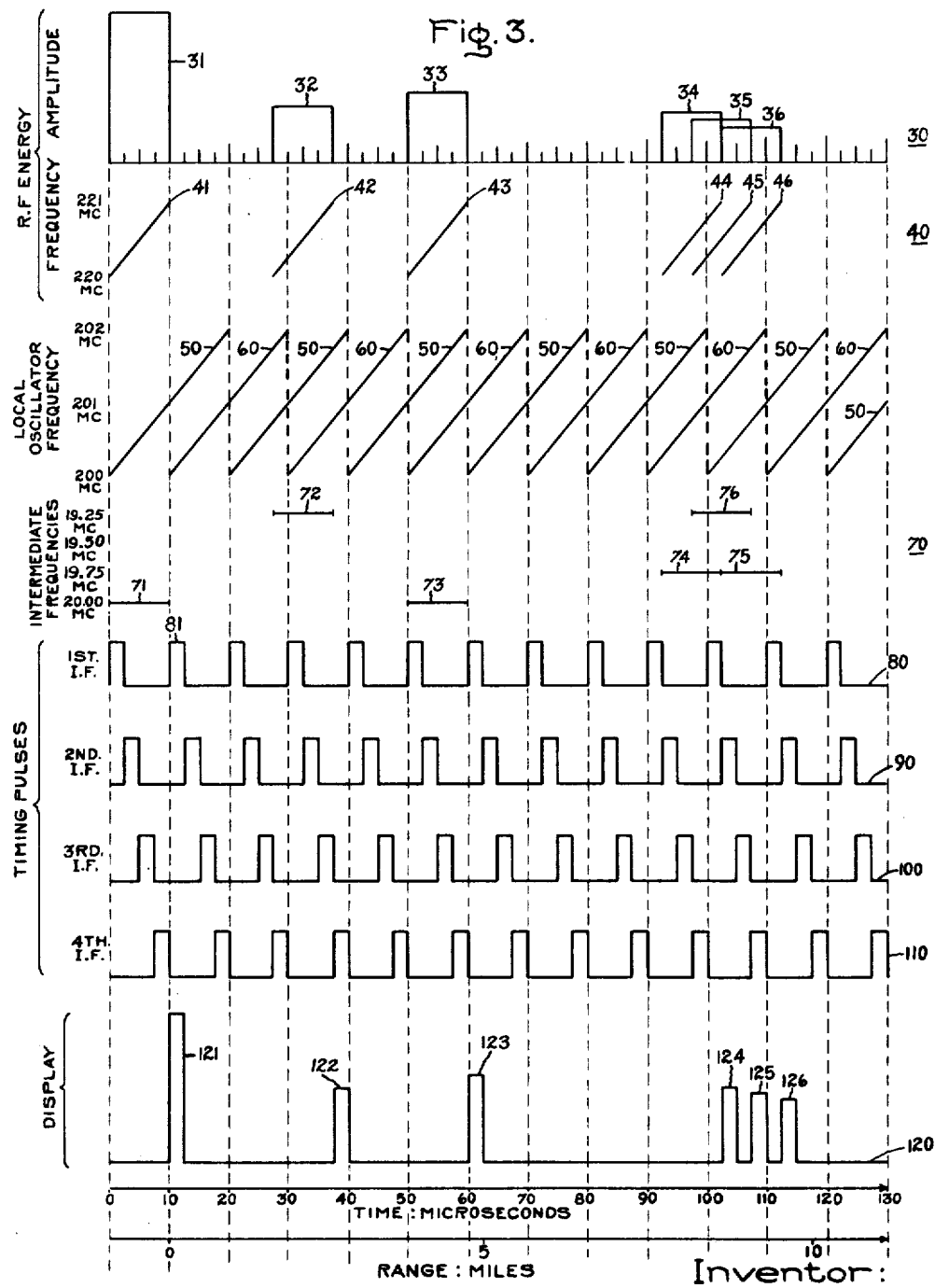

3,140,489
FREQUENCY MODULATED PULSE RADAR
SYSTEM
John W. Downie, Dewitt, N.Y., assignor to General Electric Company, a corporation of New York
Continuation of application Ser. No. 111,266, Aug. 19, 1949. This application Oct. 12, 1961, Ser. No. 149,141
16 Claims. (Cl. 343—17.2)

This invention relates to apparatus utilizing electromagnetic waves for determining the presence and range of objects or targets. Such apparatus comes under the general classification of radar systems, of which there are two distinct generic types commonly known as pulse radar and continuous wave radar.

The present application is a continuation of the inventor's copending patent application Serial Number 111,266, filed August 19, 1949, which has since been abandoned.

A pulse radar system comprises apparatus for transmitting short bursts or pulses of high frequency energy, a receiver for detecting echoes resulting from the reflection of the pulses from distant objects, and means for determining the time intervals between the orignal pulses and the pulse echoes. The range of the reflecting objects may thereby be determined, since the time interval between a pulse and its echo is directly related to the range or distance in accordance with the velocity of propagation of electromagnetic waves.

A continuous wave radar system comprises apparatus for transmitting high frequency waves, generally of a type whose instantaneous frequency is cyclically varied between definite limits at a predetermined rate, receiving apparatus for detecting the presence of energy occurring as a result of reflection from distant objects, and means for determining the range of reflecting objects as a function of the difference in phase or frequency between the transmitted energy and the reflected energy. Since the instantaneous frequency of the transmitted energy may be varied at a linear rate, and since the time interval between the transmission of energy at one instantaneous frequency and its return is a linear function of the range of the reflecting object, it is then a relatively simple matter to correlate frequency shift and range.

Both the pulse radar system and the frequency modulation system have certain advantages for different types of applications, and also have definite limitations which restrict their usefulness. In a pulse radar system, the amount of energy transmitted per unit of time is proportional to the pulse length and to the pulse power. The maximum range at which objects can be detected is constant when the product of these two factors is maintained constant. This relationship presupposes that the product of pulse length and receiver bandwidth is also maintained constant as the pulse length is varied. On the other hand, lengthening the pulse at constant amplitude and narrowing the receiver bandwidth permit a better signal to noise ratio and a greater detection range. With many types of transmitting tubes, the peak pulse power is limited so that it is not feasible to increase range by increasing the pulse power. Moverover, increased pulse power presupposes a higher operating voltage for the transmitting tubes, which in turn presupposes a higher voltage supply and increased insulation in the equipment, bringing economic factors into consideration.

On the other hand, increasing the pulse length or, in other words, the time duration of the successive pulses, reduces the ability of the radar apparatus to discriminate between separate reflecting objects or targets. For instance taking 186,000 miles per second as the velocity of electromagnetic waves, the equivalent velocity of travel of electromagnetic energy from a point to a target and return is 93,000 miles per second or 0.093 mile per microsecond. Thus a pulse having a time duration of 10 microseconds will cause overlapping echoes upon reflection from targets which are spaced less than 0.93 mile apart. Although even in the case of overlapping echoes, an experienced operator may distinguish between objects to a certain extent, it is apparent that definite limitations exist in this direction. As a result, the resolution of a radar system, or its ability to discriminate between closely spaced targets, becomes an important factor in limiting the maximum allowable pulse length.

In a continuous wave frequency modulation radar system, it is very difficult to distinguish between different reflecting objects, because the principal echo tends to cover up minor echoes. Such systems find their principal use in radio altimeters for aircraft in which the only important reflecting object is the surface of the earth. However, the frequency modulation radar system has the advantage of requiring a peak power which is no greater than the average power of the equipment.

My invention relates specifically to a radar system which combines some of the features of both the pulse and frequency modulation systems.

Accordingly, it is an object of my invention to provide a radar system combining features of pulse and frequency modulation radar in a more economical and advantageous system.

Another object of my invention is to provide a radar system in which it is possible to reduce the peak pulse power by increasing the pulse length, without reducing the ability of the system to resolve closely spaced objects.

A further object of my invention is to provide a radar system which has greater freedom from the interfering effects of extraneous electromagnetic radiation than the constant frequency pulse radar systems presently in use.

In accordance with my invention, I provide a pulse transmitter in which the instantaneous frequency of electromagnetic energy during a pulse is continuously varied in a linear fashion with respect to time. In consequence, the frequency of the pulse echoes received from reflecting objects will also vary with respect to time. A local oscillator, which is used for producing an intermediate frequency through heterodyning with the received pulse echo, is continuously and cyclically varied at a linear rate between definite limits. Through this means, the intermediate frequencies resulting from the varying frequency of the pulse echoes heterodyning with the varying frequency of the local oscillator are constant and spaced apart in accordance with the location of the reflecting object in a distance equivalent to the time duration of one of the transmitted pulses. Furthermore, I provide a plurality of narrow band intermediate frequency amplifiers which are normally blocked off from a video amplifier and a display tube. These intermediate frequency amplifiers have relatively narrow bandwidths and are tuned so that their center frequencies are evenly spaced over the range of intermediate frequencies, produced by the interaction of the pulse echoes and the local oscillator. A timing unit is utilized to gate the intermediate frequency amplifiers and cause the output of each one of them in turn to be supplied to the video amplifier.

For further objects and advantages and for a better understanding of the invention, attention is now directed to the following description and accompanying drawings. In the appended claims, the features of the invention believed to be novel are more particularly pointed out.

In the drawings, FIG. 1 is a simplified schematic diagram, in block form, of a radar system embodying my invention;

FIG. 2 is a curve illustrating certain operating characteristics of the intermediate frequency amplifiers of FIG. 1; and FIG. 3 comprises a series of curves, drawn to a common time scale, illustrating the operating characteristics of the radar system shown in FIG. 1.

Referring to FIG. 1, the radar system comprises a transmitter 1 which supplies, at predetermined time intervals, pulses of energy to a radiating antenna 2. These pulses of energy are illustrated generally by curve 3, wherein the arrow 4 indicates the direction of travel away from the antenna 2. Energy is received, both as a result of direct radiation from the transmitting antenna 2, and also as echoes resulting from reflections of the original pulse 3 from objects in its path of propagation, by a receiving antenna 5. This is illustrated generally by curve 6, wherein the arrow 7 represents the direction of travel of reflected energy towards the antenna 5. The received energy is amplified in a radio frequency amplifier 8 and supplied to a converter 9, wherein it mixes or heterodynes with a signal supplied by a local oscillator 10. The output of the converter is supplied to four intermediate frequency amplifiers 11, 12, 13 and 14, which have their input circuits connected in parallel. The output circuits of all four amplifiers are also connected in parallel to a detector 15. The output voltage of the detector is supplied to a video amplifier 16, wherein it is amplified and from where it is applied to the deflection plates of a cathode ray tube 17. The transmitter 1 contains a pulsing circuit, which, in addition to controlling the operation of the high frequency transmitting circuit, provides a control signal to a timing unit 18. The timing unit 18 provides a control signal to the local oscillator 10 and also control signals to all four of the intermediate frequency amplifiers 11, 12, 13 and 14.

The operation of the different elements of FIG. 1 will now be explained in conjunction with the curves of FIG. 2 and FIG. 3.

Referring to FIG. 3, the curves therein have been plotted on a common time scale, and a range or distance scale has also been provided to facilitate a comparison of the time of occurrence of the different events, with their significance in the determination of the range of the reflecting objects. To simplify the explanation of the operation of the apparatus, definite operating frequencies have been selected for the diverse parts of the apparatus, but it is clearly to be understood that these frequencies are given simply by way of illustration and not to limit the invention thereto.

Curves 30 and 40 illustrate respectively the amplitude and frequency of the electromagnetic energy received at the receiving antenna 5. The rectangular pulse 31 represents the burst of radio frequency energy of constant amplitude received through direct radiation from the transmitter 1. This pulse has a time duration of 10 microseconds, and a frequency which varies linearly between the limits of 220 and 221 megacycles per second, from its inception to its termination, as illustrated by section 41 of curve 40. Referring again to curve 30, the rectangular pulses 32, 33, 34, 35 and 36 illustrate pulse echoes received at the receiving antenna 5, as a result of reflection of energy contained in the original pulse 31, from objects in its path of propagation. These pulses occur at times displaced from the occurrence of the original pulse 31, and the delay between the leading edges of these pulses and that of pulse 31 is directly proportional to the range of the reflecting object from the radar apparatus. Sections 42, 43, 44, 45 and 46 of curve 40 illustrate, respectively, the variation in frequency of these pulses with respect to time. It will be noted that whereas pulses 32 and 33 occur at intervals in time which are completely distinct, so that there is no overlapping between the pulses, the same does not apply to pulses 34, 35 and 36. These latter pulses all overlap and would cause pronounced confusion on a normal radar presentation. All of the above pulses are amplified in the radio frequency amplifier 8, which has sufficient bandwidth to transmit the pulses, without distortion in waveform, to the converter 9.

At the inception or beginning of each transmitted pulse, the transmitter 1 supplies a signal to the timing unit 18, which, in turn, supplies a signal to the local oscillator 10. The local oscillator comprises actually two oscillating circuits, of which one goes into operation immediately upon the inception of the transmitted pulse, and, starting at its initial frequency of 200 megacycles, shifts linearly with the time up to a frequency of 202 megacycles in 20 microseconds. At 20 microseconds, the first oscillating circuit reverts to a frequency of 200 megacycles, and again shifts linearly with time up to a frequency of 202 megacycles at 40 microseconds. Thereafter the first oscillating circuit goes through the same cycle at 20 microsecond time intervals. The second circuit goes into operation at 10 microseconds at a frequency of 200 megacycles, and similarly shifts from 200 to 202 megacycles at 20 microsecond time intervals. The operation of the first oscillating circuit is indicated by curve 50, and that of the second oscillating circuit by curve 60.

The intermediate frequencies resulting from the interaction of the signals from radio frequency amplifier 8 with those from local oscillator 10 in converter 9 are shown in graph 70. Section 71 thereof illustrates the intermediate frequency resulting from the heterodyning of the pulse 31 with the section of local oscillator curve 50 during time 0 to 10 microseconds. Since both the pulse frequency and the local oscillator frequency are varying at the same rate, their difference frequency is constant and amounts to 20 megacycles. Section 72 of graph 70 is the intermediate frequency resulting from the interaction of pulse 32 with curve 50 during the time 27.5 to 37.5 microseconds. In this case, the local oscillator output comprises two oscillations whose frequencies have shifted to 200.75 and 201.75 megacycles at the inception of the pulse echo and, accordingly, the intermediate frequency signals occur at 19.25 and 18.25 megacycles respectively. The two intermediate frequencies are then passed through frequency selective amplifiers to be described, whereby only the intermediate frequencies existing in the 19,125 to 20.125 megacycle range are utilized. In the case of intermediate frequency 72, the selected frequency corresponds to the intermediate frequency resulting from mixing the waves of graph 50 with the waves of graph 42. Similarly, sections 73, 74, 75 and 76 of graph 70 represent the intermediate frequency signals resulting from the interaction of pulse echoes 33 to 36 with the corresponding local oscillator frequencies and after passage through frequency selective amplifiers to be described shortly.

For purposes of simplification, all the pulse echoes described above have been selected as occurring at even quarters of 10 microsecond time intervals. This is to facilitate the explanation of the operation of the four intermediate frequency amplifiers which will now be described. The intermediate frequency amplifiers 11 to 14 are relatively narrow bandwidth amplifiers. The first intermediate frequency amplifier 11 is tuned to a center frequency of 20.00 megacycles and has a band width of 0.250 megacycle, so that it can accept signals extending to 0.125 megacycle on either side of its center frequency. Similarly, intermediate frequency amplifiers 12, 13 and 14 are tuned to 19.75, 19.50 and 19.25 megacycles, respectively and have similar bandwidths.

In accordance with well-known principles, a relatively narrow bandwidth amplifier does not attain its full response immediately upon the application of a pulse, but takes a finite time to build up to its peak amplitude. After the signal is ended, the response, likewise, takes a finite time to decay to zero. This is illustrated in FIG. 2 wherein the curve 20 illustrates the response of the intermediate frequency amplifiers to a sharp rectangular pulse. The exciting pulse, occurring in time 0 to 10 microseconds, is illustrated by the dotted rectangle 21 which has been shown cross-hatched. Each of the intermediate frequency amplifiers 11 to 14, in this particular embodiment, has a bandwidth and a transient response characteristic such that maximum response is attained at the termination of a signal lasting 10 microseconds. Moreover, the amplifiers are tuned to center frequencies differing by 250 kilocycles, as has previously been mentioned. Although the amplifiers are always connected to the converter 9, their last stage of amplification, which is an electron discharge device, is normally blocked off so that no output is supplied to the detector.

The timing unit 18, beginning at the inception of a pulse from the transmitter provides a series of rectangular gating pulses to each of the four intermediate frequency amplifiers. These pulses occur at 10 microsecond time intervals, have a duration of 2.5 microseconds, and are offset in time, one with respect to the other, by 2.5 microseconds. Thus the curves 80, 90, 100 and 110 illustrate the gating pulses supplied to intermediate frequency amplifiers 11, 12, 13 and 14 respectively.

Referring now to FIG. 2, the cross-hatched rectangular section 22, shown in dotted outline between times 10.0 and 12.5 microseconds, illustrates the gating pulses applied to one of the intermediate frequency amplifiers. It will be noted that the gating pulses permit the amplifier to transmit its energy to the detector immediately after it has reached its peak amplitude. Thus, the four intermediate frequency amplifiers serve to store up information for periods of ten microseconds, and to deliver their information to the detector for periods of two and one-half microseconds. It will moreover be noted that the gating pulses to the four intermediate amplifiers are timed to occur immediately after the time interval during which a pulse echo in the receiver may combine with a local oscillator frequency to produce an intermediate frequency falling within the ranges of the four intermediate frequency amplifiers.

Referring to FIG. 3, curve 120 illustrates the signals received by the detector and video amplifier and finally appearing on the fluorescent screen of the cathode ray indicator 17. Pulse 121 illustrates the signal sampled from intermediate frequency amplifier 11 as a result of the gating pulse 81 operating thereon to allow the sampling of the intermediate frequency signal represented by section 71 of graph 70. Pulses 122 to 126 represent the display indications corresponding to pulse echoes 32 to 36, respectively. It will be noted that the presentation of pulse echoes on the fluorescent screen is delayed by 10 microseconds after the beginning of reception of the actual corresponding pulse echo at the receiver. Moreover, it will be noted that the pulse echo indications on the indicator screen have a length or time duration of 2.5 microseconds, and not 10 microseconds as in the original pulses. This permits the differentiation or separation of overlapping echoes such as 34, 35 and 36, as illustrated by the display pulses 124, 125 and 126.

Although the pulse echoes have been shown as occurring at even quarters of 10 microsecond time intervals, in practice they occur at any time. However, this simply results in the division of a signal between two of the intermediate frequency amplifiers. This may cause a spreading out of the signal on a time basis. However, this can readily be corrected to any desired degree by providing a greater number of intermediate frequency amplifiers which are gated on for corresponding shorter time intervals.

Thus my invention combines certain advantages of both pulse radar and frequency modulation radar to provide a radar system giving the same target resolution as a pulse radar system having a peak power which has been decreased by a factor of four. Moreover, my radar system is much less subject to interference from other radar systems because its frequency of operation is continually varied over a wide range. This is particularly advantageous in wartime operations when intentional interference or jamming by enemy equipment has to be contended with.

While a specific embodiment has been shown and described, it will, of course, be understood that various modifications may be made without departing from the invention. Thus, although I have shown only four intermediate frequency amplifiers, it will be quite apparent that a much greater number could be provided with corresponding increase in the permissible pulse length, without any deterioration of the resolving power of the system.

The appended claims are therefore intended to cover any such changes and modifications as fall within the true spirit and scope of my invention.

What I claim as new and desire to secure by Letters Patent of the United States is:

1. A radar system comprising means for generating pulses of high frequency energy whose instantaneous frequency varies at a predetermined rate during said pulses, means for receiving echoes resulting from the reflection of said pulses from objects, means for generating oscillations with a repetitive frequency variation occurring at said rate between predetermined limits, means for combining said echoes and said oscillations to produce signals of constant frequency occurring within a band, a plurality of amplifiers tuned to different frequencies within said band, means for applying said produced signals to said amplifiers for amplification thereby, and means responsive successively to each of the amplified signals for providing an indication of the range of said objects in accordance with the time intervals between said signals.

2. A radar system comprising means for generating pulses of high frequency energy whose instantaneous frequency varies at a predetermined rate during said pulses, means for receiving echoes resulting from the reflection of said pulses from objects, means for generating oscillations with a repetitive frequency variation occurring at said rate between predetermined limits, means for combining said echoes and said oscillations to produce signals of constant frequency occurring within a band, a plurality of amplifiers tuned to different frequencies within said band, means for applying said produced signals simultaneously to said amplifiers for amplifying said signals, said amplifiers having normally inoperative output circuits, means for providing an indication of the range of said objects in accordance with the time intervals between said signals comprising indicating means, and a timing unit for repeatedly rendering said output circuits operative in sequence in accordance with the frequency variation of said generated oscillations for applying said amplified signals to said indicating means.

3. A radar system comprising means for generating pulses of high frequency energy whose instantaneous frequency varies at a predetermined rate during said pulses, means for receiving echoes resulting from the reflection of said pulses from objects, means for generating oscillations with a repetitive frequency variation occurring at said rate between predetermined limits, means for combining said echoes and said oscillations to produce signals of constant frequency occurring within a band, a plurality of amplifiers, said amplifiers having individually tuned input circuits connected in parallel, means for applying said produced signals to said tuned input circuit for amplification by said amplifiers, said input circuits having bandwidths evenly distributed over said band, said amplifiers having normally inoperative output circuits, a common detector connected to said output circuits for demodulating said signals, means for determining the range between said objects in accordance with the time intervals between said signals comprising an indicating system, and a timing unit for repeatedly rendering each one of said output circuits operative in turn for a portion of each said repetitive frequency variation for applying said amplified signals through said detector to said indicating system.

4. A radar system comprising a transmitter for radiating pulses of high frequency energy whose instantaneous frequency varies linearly through a fixed difference during their time duration, a receiver for receiving echoes resulting from the reflection of said pulses from objects in their path of propagation, a local oscillator for generating a pair of oscillations, one beginning at the inception and the other at the termination of said pulses, said oscillation varying linearly and repeatedly in frequency through twice said difference during time intervals of twice said time durations, a converter for heterodyning said received echoes with said pair of oscillations to produce signals of constant frequency occurring within a band, a plurality of amplifiers, said amplifiers having individually tuned input circuits connected in parallel to said converter, said input circuits having band-widths evenly distributed over said band, said amplifiers having normally inoperative output circuits, a detector connected to said output circuits for demodulating said signals, means for determining the range between said objects in accordance with the time intervals between said signals comprising an indicating system, and a timing unit for repeatedly rendering each of said output circuits operative in turn for a portion of sequential time intervals equal to said time duration, for applying said amplified signals through said detector to said indicating system.

5. A radar system comprising a transmitter for radiating pulses of high frequency energy whose instantaneous frequency varies linearly through a fixed difference during their time duration, a receiver for receiving echoes resulting from the reflection of said pulses from objects in their path of propagation, a local oscillator for generating two series of electrical oscillations, one beginning at the inception and the other at the termination of said pulses, said oscillations varying linearly and repeatedly in frequency through twice said difference during time intervals of twice said time duration, a converter for heterodyning said received echoes with said oscillations to produce signals of constant frequency occurring within a band, a plurality of amplifiers, said amplifiers having individually tuned input circuits connected in parallel to said converter, said input circuits having bandwidths evenly distributed over said band, and each input circuit having a transient response characteristic such that maximum response of each input circuit is attained at the termination of a signal of said time duration, said amplifiers having normally inoperative output circuits, a detector connected to said output circuits for demodulating said signals, means for indicating the range between said objects in accordance with the time intervals between said signals comprising an indicating system, and a timing unit for repeatedly rendering each of said output circuits operative in turn for a portion of sequential time intervals equal to said time duration and substantially during the time when said maximum response has been attained for applying said amplified signals through said detector to said indicating system.

6. An obstacle detection system comprising means for recurrently transmitting pulses of wave energy of a frequency variable over a given range at a predetermined rate during each pulse interval, means for receiving corresponding pulses from objects located in the path of propagation thereof, a source of local oscillations, means for repetitively varying the frequency of said local oscillations over a range of said rate, means for combining said oscillations with the wave energy component of received pulses to provide a resultant wave energy within a band of intermediate frequencies, a plurality of intermediate-frequency translating stages normally inoperative to translate wave energy and selective to different frequencies within said band, each coupled to said combining means and each having a bandwidth narrow as compared with said given range of frequency variation, an indicator coupled to said stages, and means timed with the repetition rate of frequency variation of said local oscillations for operatively conditioning said stages in succession during repetitive operating periods, each such period having a duration comparable with that of said pulse interval.

7. An obstacle detection system comprising a source of wave energy, means for frequency-modulating said wave energy over a given range at a predetermined rate, means for receiving said transmitted wave energy after re-radiation from obstacles located in the path of propagation thereof, means coupled to said receiving means for processing received wave energy to provide processed wave energy having a frequency within another range in accordance with the distance of said obstacles, a plurality of amplifiers selective to different frequencies, each coupled to said processing means and having a relatively narrow pass band as compared with said other range, an indicator coupled to said amplifiers, each of said amplifiers being thereby included in an individual, normally disabled wave-energy-translating path extending between said processing means and said indicator, and means for operatively conditioning said translating paths in succession.

8. An obstacle detection system comprising means for recurrently transmitting pulses of wave energy of a frequency variable over a given range at a predetermined rate during each pulse interval, means for receiving transmitted pulses after reflection from an object located in the path of propagation thereof, a source of a pair of local oscillations, means for repetitively varying the frequency of each of said local oscillations over a common frequency range at said rate, the variation in frequency of said pair of local oscillations occurring in fixed, phase-displaced relation with respect to one another, means for combining at least one of said pair of local oscillations with the wave energy component of received pulses to provide a resultant wave energy within a band of intermediate frequencies, a plurality of intermediate-frequency translating stages normally inoperative to translate wave energy and selective to different frequencies within said band, each coupled to said combining means and each having a bandwidth narrow as compared with said given range of frequency variation, an indicator coupled to said stages, and means timed with the repetition rate of frequency variation of said local oscillation for operatively conditioning said stages in succession during repetitive operating periods, each such period having a duration comparable with that of said pulse interval.

9. An obstacle detection system comprising means for recurrently transmitting pulses of wave energy of a frequency variable over a given range at a predetermined rate during each pulse interval, means for receiving transmitted pulses after reflection from an object located in the path of propagation thereof, a source of a pair of local oscillations, means for repetitively varying the frequency of one of said oscillations at said rate over another frequency range displaced in the frequency spectrum from said given range and having limits displaced from one another in frequency by an amount greater than the displacement of the limits of said given range, means for varying the frequency of the other of said oscillations at said rate over said other frequency range, the variation in frequency of said pair of local oscillations occurring in fixed, phase-displaced relation with respect to one another, means for combining at least one of said pair of local oscillations with the wave energy component of received pulses to provide a resultant wave energy within a band of intermediate frequencies, a plurality of intermediate-frequency translating stages normally inoperative to translate wave energy and selective to different frequencies within said band, each coupled to said combining means and each having a bandwidth narrow as compared with said given range of frequency variation, an indicator coupled to said stages, and means timed with the frequency variation of said local oscillations for operatively conditioning said stages in succession during repetitive operating periods, each such period having a duration comparable with that of said pulse interval.

10. An obstacle detection system comprising means for recurrently transmitting pulses of wave energy of a frequency variable over a given range at a predetermined rate during each pulse interval, means for receiving transmitted pulses after reflection from an object located in the path of propagation thereof, a source of local oscillations, means for repetitively varying the frequency of said local oscillations over a range at said rate, means for combining said oscillations with the wave energy component of received pulses to provide a resultant wave energy within a band of intermediate frequencies, a plurality of intermediate-frequency translating stages normally inoperative to translate wave energy, each selective to an individual one of adjacent subbands included within said band of intermediate frequencies, and coupled to said combining means, an indicator coupled to said stages, and means for operatively conditioning each of said stages during successive intervals having a collective time duration equal to a pulse interval.

11. An obstacle detection system comprising a source of wave energy, means for frequency-modulating said wave energy over a given range at a predetermined rate, means for receiving said transmitted wave energy after reradiation from obstacles located in the path of propagation thereof, means coupled to said receiving means for processing received wave energy to provide processed wave energy having a frequency within another range in accordance with the distance of said obstacles, a plurality of intermediate frequency wave-energy-translating stages, normally inoperative to translate wave energy, each selective to an individual one of adjacent sub-bands of frequencies included within said other range, each coupled to said processing means and each including means for storing wave energy over an operating interval of a given duration, an indicator coupled to said stages, and means for operatively conditioning each of said translating stages during an individual one of successive operating periods, each such period having a duration smaller than the duration of said operating interval.

12. A radar system means for generating pulses of high frequency energy whose instantaneous frequency varies at a predetermined rate during said pulses, means for receiving echoes resulting from the reflection of said pulses from objects, means for generating oscillations with a repetitive frequency variation occurring at said rate between predetermined limits, means for combining said echoes and said oscillations to produce signals of constant frequency occurring within a band of frequencies, a plurality of amplifiers tuned within said band, means for applying said produced signals to said amplifiers for amplification thereby, indicating means, and means for sequentially applying the outputs of said amplifiers to said indicating means for providing an indication of the range of said objects in accordance with the time intervals between said signals.

13. A radar system comprising means for generating pulses of high frequency energy whose instantaneous frequency varies at a predetermined rate during said pulses, means for receiving echoes resulting from the reflection of said pulses from objects, means for generating oscillations with a repetitive frequency variation occurring at said rate between predetermined limits, means for combining said echoes and said oscillations to produce signals of constant frequency occurring within a band of frequencies, a plurality of amplifiers tuned within said band, means for applying said produced signals to the inputs of said amplifiers for amplifying said signals, said amplifiers having normally inoperative output circuits, means for providing an indication of the range of said objects in accordance with the time intervals between said signals comprising indicating means, and a timing unit for repeatedly rendering said output circuits operative in sequence, and means for applying said amplified signals to said indicating means.

14. A radar system comprising means for generating pulses of high frequency energy whose instantaneous frequency varies at a predetermined rate during said pulses, means for receiving echoes resulting from the reflection of said pulses from objects, means for generating oscillations with a repetitive frequency variation occurring at said rate between predetermined limits, means for combining said echoes and said oscillations to produce signals of constant frequency occurring within a band of frequency, a plurality of amplifiers tuned within said band, means for applying said produced signals to the inputs of said amplifiers for amplification thereby, and means for sequentially gating on the outputs of said amplifiers for a period of time that is short in respect to the time duration of one of said pulses for providing an indication of the range of said objects in accordance with the time intervals between said signals.

15. An obstacle detection system comprising means for recurrently transmitting pulses of wave energy of a frequency variable over a given range at a predetermined rate during each pulse interval, means for receiving transmitted pulses after reflection from an object located in the path of propagation thereof, a source of a plurality of local oscillations each repetitively varying in frequency over a common frequency range at said rate, the variation in frequency of said plurality of local oscillations occurring in fixed, phase-displaced relation with respect to one another, means for combining said local oscillations with the wave energy component of received pulses to provide a resultant intermediate frequency wave energy, a plurality of intermediate-frequency translating stages normally inoperative to translate wave energy coupled to said combining means, an indicator coupled to said stages, and means timed with the repetition rate of frequency variation of said local oscillations for operatively conditioning said stages for intervals short in respect to the duration of said pulse interval in succession during repetitive operating periods, each such period having a duration comparable with that of said pulse interval.

16. A radar system comprising means for generating pulses of high frequency energy whose instantaneous frequency varies at a predetermined rate during said pulses, means for receiving echoes resulting from the reflection of said pulses from objects, processing means for generating a plurality of oscillations each repetitively varying in frequency over a common frequency range at said rate, the variations in frequency of said plurality of local oscillations occurring in fixed phase-displaced relation with respect to one another, means for combining said echoes and said oscillations to provide resultant intermediate frequency signals, a plurality of intermediate frequency translating stages, normally inoperative to translate wave energy coupled to said processing means, and each including means for storing wave energy over an operating interval of a given duration, indicating means coupled to said stages, and means for operatively conditioning each of said translating stages in sequence, each of said stages being operatively conditioned during an individual period having a duration smaller than the duration of said operating interval.

References Cited in the file of this patent

UNITED STATES PATENTS

| | | |
|---|---|---|
| 2,423,644 | Evans | July 8, 1947 |
| 2,433,804 | Wolff | Dec. 30, 1947 |
| 2,435,615 | Varian et al. | Feb. 10, 1948 |
| 2,476,445 | Lacy | July 19, 1949 |
| 2,522,367 | Guanella | Sept. 12, 1950 |
| 2,525,328 | Wolff | Oct. 10, 1950 |